3,113,124
NOVEL ANTIOZONANTS FOR ELASTOMERS
Ivan C. Popoff, Ambler, and Harry Albert, Lafayette Hill, Pa., assignors to Pennsalt Chemicals Corporation, Philadelphia, Pa., a corporation of Pennsylvania
No Drawing. Filed Nov. 27, 1959, Ser. No. 855,527
23 Claims. (Cl. 260—45.9)

This invention deals with novel compositions useful as antiozonants in natural and synthetic rubber. In particular, this invention deals with the stabilization of natural and synthetic rubber with novel compounds made by condensing alkylene oxides with N,N'-disubstituted p-phenylenediamine derivatives.

It is known that natural and synthetic rubbers will crack on exposure to ozone. Numerous agents have been evaluated as rubber antiozonants and particularly effective agents have been found in the class of phenylenediamines of structure:

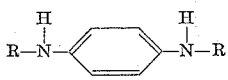

where the R groups represent alkyl, cycloalkyl, or aryl radicals. For example, N,N'-diphenly-p-phenylenediamine, N,N'-di-sec-butyl-p-phenylenediamine, and N-phenyl-N'-cyclohexylphenylenediamine are effective antiozonants.

Unfortunately, this class of p-phenylenediamine antiozonants has several disadvantages. Because these compounds discolor light stocks very badly, they can be used only in black rubber goods and even here goods containing these agents often stain light-colored articles with which they come in contact. Some of these p-phenylenediamine derivatives also have poor scorch characteristics and this complicates or prevents the processing of the rubber formulation in which they are to be used. Still another disadvantage of this class of antiozonants is their rather high volatility. Antiozonants must function by migration to the surface of the rubber in which they are incorporated, and if the antiozonant is highly volatile it will be lost. Thus, high volatility results in short-lived protection, in poor economics, and is also undesirable during processing.

The novel antiozonants of this invention are particularly advantageous in that they are effective antiozonants and have no adverse effects on the rubber in which they are incorporated. In particular, the novel antiozonants of this invention show reduced discoloration effects and reduced volatility. Furthermore, they do not accelerate the cure of the rubber; i.e., they are not scorchy. Thus, these novel compounds represent a significant advance in the art.

The improved antiozonants of this invention have the general formula:

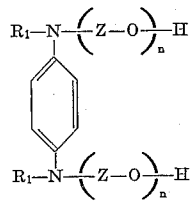

where $R_1$ is member selected from the group of alkyl, cycloalkyl and aryl radicals with the proviso that at least one $R_1$ radical is selected from the group consisting of alkyl and cycloalkyl radicals, Z is a divalent hydrocarbon radical, and $n$ is an integer from 1 to 10.

The preparation of these compounds is achieved readily by reaction of an alkylene oxide with a N,N'-disubstituted p-phenylenediamine, i.e., a compound of structure:

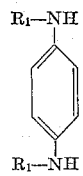

where $R_1$ is the same as defined above, providing, as above, that at least one $R_1$ radical be an alkyl or cycloalkyl radical. The p-phenylenediamine starting materials are well known and readily available by various means of synthesis; see, for example, U.S. Patents 2,498,630 and 2,867,604. Examples of p-phenylenediamines which may be used are (1) N-alkyl-N'-alkyl-p-phenylenediamines in which the substituent groups, which may be the same or different, include alkyl radicals selected from the group comprising methyl, ethyl, n-propyl, isopropyl, n-butyl, sec-butyl, tert-butyl, n-amyl, isoamyl, sec-amyl, tert-amyl, n-hexyl, n-octyl, t-octyl, 1-ethyl-3-methylpentyl, 1-methylheptyl, 1-methyloctyl, n-decyl, n-dodecyl, n-hexadecyl, octadecyl, tridecyl, and like radicals; (2) N,N'-dicycloalkyl-p-phenylenediamines in which the substituent groups are the same or different such as N,N'-bis-(cyclohexyl)-p-phenylenediamine, N-cyclohexyl-N'-methylcyclohexyl - p-phenylenediamine and the like; (3) N-alkyl-N'-cycloalkyl-p-phenylenediamines such as N-methyl-N'-cyclohexyl-p-phenylenediamine, N-sec-butyl-N'-methylcyclohexyl - p-phenylenediamine and the like; and (4) N-alkyl-N'-aryl-p-phenylenediamines where alkyl radicals are exemplified by any of the above-listed alkyl and cycloalkyl radicals and the aryl radicals are exemplified by phenyl, tolyl, xylyl, naphthyl, and the like. Further specific illustrations of useful p-phenylenediamines are N-ethyl-N'-cyclopentyl, N,N'-dinonyl, N,N'-didodecyl, N-methyl-N'-sec-butyl, N-sec-butyl-N'-isopropyl, N,N'-di(1-methyloctyl), N-tolyl-N'-cyclopentyl, N-phenyl-N'-undecyl, and the like.

The alkylene oxides which are reacted with the p-phenylenediamine are well known compounds and are exemplified by the oxides of ethylene, propylene, the isometric n-butylenes, isobutylene, n-amylenes, styrene, the isomeric methylstyrenes, the isomeric isopropylstyrenes, the isomeric naphthylstyrenes, and the like. Also useful are alkylene oxides such as butadiene monoxide. Of the above alkylene oxides we prefer to use those having the structure

where $R_2$ is hydrogen or a hydrocarbon radical containing from one to eight carbon atoms.

The reaction of the alklene oxide with the p-phenylenediamine is carried out readily in accord with known procedures for alkylene oxide condensation reactions. In general, the reaction is carried out by simply subjecting a mixture of one mole of the p-phenylenediamine and two or more moles of the alkylene oxide to reaction at elevated temperatures under autogeneous pressure. Usually the amount of alkylene oxide will be form two to twenty moles per mole of p-phenylenediamine. Reaction will occur at both N—H bonds to yield the di-substituted product and although some mono-substituted product may also be present, separation is easily effected by vacuum distillation. The molar amount of alkylene oxide used per mole of the p-phenylenediamine will, of course, determine the value of $n$ in the $(Z-O)_nH$ chain. Usually, however, an amount will be taken so that $n$ will vary between about 1 and 10. It will be understood that less than two moles of alkylene oxide per mole of p-phenylenediamine derivative may be used and in such case more of the mono-substituted compound will be formed together with the di-substituted products of this invention. It will be understood that if one $n$ is zero in the structure given above for the antiozonant compounds, then the mono-substituted compounds are obtained. Expressed another way, reaction of the alkylene oxide with the N,N'-disubstituted p-phenylenediamine yields products having the structure

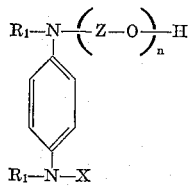

where $R_1$, $Z$, and $n$ are the same as defined above, and X is a member of the group selected from —H and $(Z-O)_nH$ radicals. As will be seen, the comparable di-substituted compounds (i.e., where X is $(Z-O)_nH$) are surprisingly superior in volatility and non-discoloring properties than compounds where X is H.

The temperature of the reaction will be between about 25° and 250° C., the reaction proceeding more slowly at the lower temperatures. Although high pressure reactions may be used, it suffices to allow reaction to occur under autogenous pressure. If desired, solvent systems may be used and such solvents will, of course, be inert to the reactants and products. Useful solvents include the aromatic hydrocarbons such as benzene, toluene, xylene, etc.; ethers and cyclic ethers (e.g., dioxane), tri-alkylamines, and the like. When the lower reaction temperatures are used, it is frequently desirable to use a catalyst and these will be inert basic compounds such as amines (trimethylamine, pyridine), alkali metal carbonates, and the like or acidic type catalysts such as HCl, $I_2$, etc., as is well known in the art.

It is found that as the value of $n$ increases the volatility of the compound decreases and this is desirable. The value of $n$ also affects antiozonant properties, the effectiveness as an antiozonant being generally decreased as $n$ increases. However, the hydrocarbon substituents on the nitrogen atoms also affect the antiozonant properties and maximum beneficial effects are obtained when each of these substituents contains from about three to about ten carbon atoms. In general, the compounds of this invention will have optimum overall properties when the nitrogen substituents contain three to ten carbon atoms, when the alkylene oxide used is ethylene, propylene or butylene oxide and when the value of $n$ is one or two.

The compounds of this invention are, in general, high boiling viscous oils or low-melting solids. These compounds have excellent thermal stability up to about 200° C. and are less subject to oxidative degradation than many other antiozonants. This last property makes these novel compounds particularly advantageous during processing of the elastomer in which they are to be used since high temperatures are frequently encountered.

The compounds of this invention have unexpectedly superior properties with respect to low volatility and non-discoloring properties. As indicated, these novel compounds are significantly better in these important properties than are the comparable antiozonant compounds containing only one alkylene oxide chain; i.e., compounds of structure

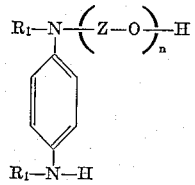

where $R_1$, $Z$, and $n$ are defined above and which are the subject matter of copending application of I. Popoff and H. E. Albert, Serial No. 855,526, filed of even date herewith. On the other hand, the mono-substituted compounds of the above structure have better antiozonant properties and may be used in those applications where discoloration and high volatility are less important.

The novel compounds of this invention are easily compounded into rubber stocks and need no special processing. The rubber materials with which they may be used include both synthetic and natural rubber. The synthetic rubbers may be any of the butadiene polymer rubbers such as styrene-butadiene rubber, polyisoprene, butadiene-acrylonitrile elastomers, and the like. Other synthetic rubbers such as the polysulfied rubbers (Thiokol), silicone rubbers, polychloroprene, polyisobutylene rubber, fluoroelastomers and the like are subject to ozone attack to a lesser extent than butadiene polymer rubbers, but the novel compounds of this invention may also be used to protect these rubbers against such ozone attack. The amount of novel antiozonant incorporated in the rubber will vary between 0.5% and about 5% based on the rubber weight depending upon efficacy and economics of the agent used. In general, however, from about 0.75% to about 3.0% will be used.

The following examples will serve to more fully illustrate the invention.

(A) PREPARATION OF THE NOVEL COMPOUNDS

*Example I.—N,N'-Bis-(Sec-Butyl)-N,N'-Bis-(2-Hydroxypropyl)-p-Phenylenediamine*

One hundred g. (1.73 moles) propylene oxide is added over a two-hour period to 330 g. (1.5 moles) N,N'-bis-(sec-butyl)-p-phenylenediamine placed in a 0.5 gal. stirred autoclave at 180–200° C. The maximum autogeneous pressure is 170 p.s.i.g. The stirring is continued for an additional four hours at 190° C. while the pressure drops to 5 to 10 p.s.i.g. The reaction product is fractionated by vacuum distillation and N,N'-bis-(sec-butyl)-N,N'-bis-(2-hydroxypropyl)-p-phenylenediamine, a brownish viscous oil, is obtained at 180° C. at 0.4 mm. Hg pressure (calc.: 71.4% C, 10.8% H, and 8.3% N; found: 71.0% C, 10.5% H, and 8.3% N). Also present in the reaction mixture is N,N'-di(sec-butyl)-N-2-hydroxypropyl-p - phenylenediamine which is a brown, viscous oil, B.P. 140° C. at 0.4 mm. Hg pressure. The di-substituted product is also obtained in 100% yield by the same procedure using 2 moles of propylene oxide per mole of N,N'-bis-(sec-butyl)-p-phenylenediamine.

*Example II.—N,N'-Bis-(Sec-Butyl)-N,N'-Bis-(2-Hydroxyethyl)-p-phenylenediamine*

1.3 moles of ethylene oxide is reacted with 1.0 mole of N,N'-bis-(sec-butyl)-p-phenylenediamine in accordance with the procedure of Example I. A yield of 26% of N,N'-bis-(sec-butyl)-N,N'-bis - (2 - hydroxyethyl) - p-phenylenediamine is isolated by fractionation of the crude reaction product.

N,N-bis-sec-butyl-N,N'-bis(2-hydroxyethyl)-p - phenylenediamine is a brownish solid, B.P. 193° C. at 0.15 mm.

Hg pressure, M.P. 73° C. (from n-hexane). (Calc.: 70.1% C, 10.4% H and 10.4% N; found: 70.2% C, 10.4% H and 10.3% N.)

Also present in the crude product is N,N'-di-(sec-butyl)-N-(2-hydroxyethyl)-p-phenylenediamine, a brownish viscous oil, B.P. 155° C. at 0.2 mm. Hg pressure (calc.: 72.8% C, 10.6% H and 10.6% N; found: 7.30% C, 10.3% H, and 10.7% N). The di-substituted compound is also obtained in 100% yield by the same procedure using 2 moles of ethylene oxide per mole of N,N'-di-sec-butyl-p-phenylenediamine.

*Example III.—N,N'-Bis[3-(5-Methyl)Heptyl]-N,N'-Bis(2-Hydroxyethyl)-p-Phenylenediamine*

This product is obtained by the same procedure as described for Example 1 using 2.2 moles of ethylene oxide per mole of N,N'-bis[3-(5-methyl)-heptyl]-p-phenylenediamine. The crude product, obtained in 96% yield, is fractionated to isolate the pure N,N-bis-[5-methyl)heptyl] - N,N' - bis(2-hydroxyethyl)-p-phenylenediamine in 73% yield. It is a viscous brownish oil boiling at 230° C. at 0.1 mm. Hg pressure. Calc.: 74.3% C and 6.6% N; found: 74.2% C and 6.67% N. The absence of —NH group and the presence of —OH group is confirmed by infrared analysis.

*Example IV.—Reaction Product (J) of N,N'-Bis[3-(5-Methyl)-Heptyl]-p-Phenylenediamine With 5.8 Moles Ethylene Oxide*

The product is obtained in 100% crude yield by essentially the same procedure used in Example I by reacting 5.8 moles of ethylene oxide with one mole of N,N'-bis[3-(5-methyl)heptyl]-p-phenylenediamine. The product is a brown viscous oil.

*Example V.—Reaction Product of N-Phenyl-N'-Cyclohexyl-p-Phenylenediamine With Four Moles of Ethylene Oxide*

To a mixture of 133 g. (0.5 mole) of N-phenyl-N'-cyclohexyl-p-phenylenediamine and 10 g. (0.1 mole) of triethylamine held at 190° to 200° C. in a 1 gal. autoclave is added with stirring 88 g. (2 moles) of ethylene oxide. As the reaction proceeds, the addition of ethylene oxide is adjusted so that the pressure does not exceed 120 p.s.i.g. After all the ethylene oxide is added, stirring is continued until the pressure drops to about 35 p.s.i.g. and the triethylamine is then distilled off. The distillation residue in the autoclave is the crude antiozonant reaction products consisting of a mixture of compounds having the structure

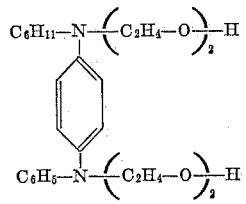

and

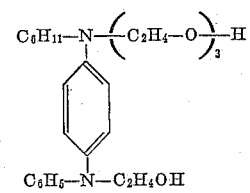

This crude mixture shows aniozonant activity and has very low volatility and good non-discoloring properties.

(B) TESTS FOR THE EVALUATION OF THE COMPOUNDS (B–1) *Antiozonant effects.*—Two parts per hundred rubber of antiozonant are added to the following base rubber compound:

|  | Parts |
|---|---|
| SBR–1500 | 100 |
| HAF Black | 50 |
| ZnO | 5 |
| Stearic acid | 3 |
| Petroleum residue softener | 10 |
| Sulfur | 2 |
| N-cyclohexyl-2-benzothiazylsulfenamide | 1 |

Sheets are prepared and are press cured 60 minutes at 150° C. Specimens are stretched 20% and exposed at 37.8° C. to ozone at a concentration of 50 parts per one hundred million. The time is noted for the first crack to appear on either one of the four sides of the specimen. An "antiozonant factor" is obtained by comparing this time with the time necessary for the first crack to appear on a specimen containing no antiozonant. A control with no antiozonant is taken as 1.0 and a value higher than 1.0 for the "antiozonant factor" indicates antiozonant protection.

(B–2) *Scorch testing.*—A base rubber compound of the following composition is prepared:

|  | Parts |
|---|---|
| Pale crepe | 100 |
| Calcium carbonate | 10 |
| Zinc oxide | 50 |
| Titanium dioxide | 20 |
| Stearic acid | 2 |
| Spider sulfur | 3 |
| Bis(2-mercaptobenzothiazolyl) disulfide (MBTS) | 1 |

One part per hundred rubber of the antiozonant is added to the above rubber compound to obtain test rubber samples. The time is measured for a 5 and 10 unit Mooney viscosity increase for each of the samples at 128° C. As is known in the art, the longer the time for the viscosity increase the lower the scorch character.

(B–3) *Volatility testing.*—A known amount (between 2 and 3 grams) of each compound to be tested is placed in a Petri dish and the percent weight loss is determined after exposure in a hot air circulating oven held at 121° C.

(B–4).—*Discoloration tests.*—One part per hundred rubber of each product tested is added to the following base rubber compound:

|  | Parts |
|---|---|
| Pale crepe | 100 |
| Calcium carbonate | 10 |
| Zinc oxide | 50 |
| Titanium dioxide | 20 |
| Stearic acid | 2 |
| Spider sulfur | 3 |
| MBTS | 1 |

Sheets are press cured 30 minutes at 150° C. One-half of each 1 x 4 inch specimen is exposed to a sunlamp for 48 hours. The discoloration of the specimen is compared with the discoloration of the blank specimen and rated.

The following Table I shows the results obtained and also compares the compounds of this invention with prior art compounds and with related mono-substituted compounds.

TABLE I

| p-Phenylenediamine Compound | Anti-ozonant Factor | Minutes for Mooney Viscosity Increase | | Volatility, Percent Weight Loss at 121° C. after— | | | Color of Treated Elastomer After Exposure |
|---|---|---|---|---|---|---|---|
| | | 5 Units | 10 Units | 2 Hrs. | 8 Hrs. | 24 Hrs. | |
| N, N'-bis-(sec-butyl)-N, N'-bis-(2-hydroxypropyl)- | 1.6 | 32.0 | 35.5 | | | | |
| N, N'-bis-(sec-butyl)-N, N'-bis-(2-hydroxyethyl)- | 2.3 | | | 0.2 | 1.6 | 7.8 | Light bluish grey. |
| N, N'-bis-(sec-butyl)- | 7.2 | 8.3 | 9.1 | 60.5 | 97 | | Very dark brown. |
| N, N'-bis [3-(5-methyl) heptyl]-N, N'-bis (2-hydroxyethyl)- | 2.0 | | | 0.0 | 0.01 | 2.0 | |
| N, N'-bis[3-(5-methyl)heptyl]-plus 5.8 moles ethylene oxide. | 2.0 | 28.8 | 30.8 | [1] 7.1 | 7.1 | 7.1 | Very light tan. |
| N, N'-bis[3-(5-methyl) heptyl]- | 6.0 | 22.1 | 24.0 | 1.7 | 9.7 | 30.0 | Dark brown. |
| N, N'-diphenyl | 1.5 | | | | | | |
| N, N'-phenyl-N'-cyclohexyl | 2.0 | | | | | | |
| N, N'-bis-(sec-butyl)-N, N'-bis (methyl)- | 2.2 | | | 62.5 | 99.5 | | |

[1] This sample contained a small amount of volatile impurity.

The following Table II compares the novel compounds of this invention with the related monosubstituted compounds.

TABLE II

| | Anti-ozonant Factor | Minutes for Mooney Viscosity Increase | | Volatility, Percent Weight Loss at 121° C. after— | | | Color of Treated Elastomer After Exposure |
|---|---|---|---|---|---|---|---|
| | | 5 Units | 10 Units | 2 Hrs. | 8 Hrs. | 24 Hrs. | |
| N, N'-di-(sec-butyl)-N-(2-hydroxypropyl)-k | 3.2 | 36.5 | 39.5 | 13 | 38.5 | 36.5 | Light brown. |
| N, N'-bis(sec-butyl)-N, N'-bis(2-hydroxypropyl)- | 1.6 | 32.0 | 35.5 | | | | |
| N, N'-di(sec-butyl)-N-(2-hydroxyethyl)- | 5.5 | 35.0 | 37.5 | 5.5 | 25.0 | 65.5 | |
| N, N'-bis(sec-butyl)-N, N'-bis (2-hydroxyethyl)- | 2.3 | | | 0.2 | 1.6 | 7.8 | Light bluish grey. |
| N, N'-di[3-(5-methyl)heptyl]-N-(2-hydroxyethyl)-[1] | 3.0 | | | 0.03 | 1.3 | 7.3 | |
| N, N'-bis[3-(5-methyl)heptyl]-N, N'-bis(2-hydroxyethyl)- | 2.0 | | | 0.0 | 0.01 | 2.0 | |

[1] The preparation of this compound is given in Example IV of the copending application of I. Popoff and H. E. Albert, Serial No. 855,526 filed of even date herewith.

Since numerous variations of this invention will be apparent to the skilled artworker, the above specific embodiments shall not be construed as limiting this invention.

We claim:

1. Novel compositions of matter having the chemical formula

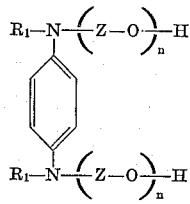

where $R_1$ is a member selected from the group consisting of alkyl, cycloalkyl, and aryl radicals containing from one to eighteen carbon atoms and with the proviso that at least one $R_1$ radical is selected from the group consisting of alkyl and cycloalkyl radicals, Z is a divalent hydrocarbon radical selected from the group consisting of ethylene and substituted ethylene radicals wherein said substituent contains from 1 to 10 carbon atoms, and $n$ is an integer from 1 to 3.

2. A composition as defined in claim 1 where $R_1$ is an alkyl radical.

3. N,N-bis - (sec-butyl) - N,N'-bis-(2-hydroxyethyl)-p-phenylenediamine.

4. N,N'-bis - (sec-butyl) - N,N'-bis(2-hydroxypropyl)-p-phenylenediamine.

5. N,N'-bis - [3 - (5 - methyl)heptyl] - N,N'-bis-(2-hydroxyethyl)-p-phenylenediamine.

6. A composition as defined in claim 1 where at least one $R_1$ is a cycloalkyl radical.

7. A composition as defined in claim 1 wherein one $R_1$ radical is an aryl radical.

8. An elastomer composition protected against the effects of ozone containing from about 0.5% to about 5% based on the weight of the rubber of a compound having the structure defined in claim 1.

9. The composition of claim 8 wherein the elastomer is natural rubber.

10. The composition of claim 8 wherein the elastomer is a butadiene polymer rubber.

11. An elastomer composition stabilized against the effects of ozone containing from about 0.5% to about 5% based on the weight of the elastomer of N,N'-bis-(sec-butyl)-N,N'-bis(2-hydroxyethyl)-p-phenylenediamine.

12. The composition of claim 11 wherein the elastomer is natural rubber.

13. The composition of claim 11 wherein the elastomer is a butadiene polymer rubber.

14. The elastomer composition of claim 8 where the compound is N,N'-bis[3-(5-methyl)hepty]-N,N'-bis-(2-hydroxyethyl)-p-phenylenediamine.

15. The composition of claim 14 where the elastomer is natural rubber.

16. The composition of claim 14 where the elastomer is a butadiene polymer rubber.

17. The elastomer composition of claim 8 where the compound is N,N' - bis(sec-butyl)-N,N'-bis(2-hydroxypropyl)-p-phenylenediamine.

18. The composition of claim 17 wherein the elastomer is natural rubber.

19. The composition of claim 17 wherein the elastomer is a butadiene polymer rubber.

20. The elastomer composition of claim 8 where the compound is the reaction product of 1 mole of N,N'-bis[3-

(5-methyl) heptyl]-p-phenylenediamine with about 6 moles of ethylene oxide.

21. The process of protecting elastomers against ozone degradation by compounding said elastomers with from about 0.5% to about 5.0% by weight of the elastomer of a compound defined in claim 1.

22. The process of claim 21 where the compound is N,N' - bis - (sec-butyl) - N,N' - bis-(2 - hydroxyethyl)p-phenylenediamine.

23. The process of claim 21 where the compound is N,N' - bis - [3 - (5 - methyl)heptyl] - N,N' - bis(2 - hydroxyethyl)-p-phenylenediamine.

References Cited in the file of this patent

UNITED STATES PATENTS

| | | |
|---|---|---|
| 2,163,166 | Wilmanns et al. | June 20, 1939 |
| 2,348,842 | Paul | May 16, 1944 |
| 2,576,458 | Hill et al. | Nov. 27, 1951 |
| 2,867,604 | Rosenwald et al. | Jan. 6, 1959 |
| 2,876,263 | Mark | Mar. 3, 1959 |